US008661265B1

(12) United States Patent
Dunn

(10) Patent No.: US 8,661,265 B1
(45) Date of Patent: *Feb. 25, 2014

(54) PROCESSOR MODIFICATIONS TO INCREASE COMPUTER SYSTEM SECURITY

(76) Inventor: David Dunn, Sammamish, WA (US)

( * ) Notice: Subject to any disclaimer, the term of this patent is extended or adjusted under 35 U.S.C. 154(b) by 822 days.

This patent is subject to a terminal disclaimer.

(21) Appl. No.: 11/479,486

(22) Filed: Jun. 29, 2006

(51) Int. Cl.
G06F 11/30 (2006.01)

(52) U.S. Cl.
USPC ........... 713/193; 710/316; 710/260; 711/147; 711/152

(58) Field of Classification Search
USPC ............... 726/26–33; 713/193; 710/316, 260; 711/141, 152
See application file for complete search history.

(56) References Cited

U.S. PATENT DOCUMENTS

| | | | |
|---|---|---|---|
| 5,627,962 A | 5/1997 | Goodrum et al. | |
| 5,638,532 A | 6/1997 | Frame et al. | |
| 5,682,509 A | 10/1997 | Kabenjian | |
| 5,805,880 A | 9/1998 | Pearce et al. | |
| 5,809,314 A | 9/1998 | Carmean et al. | |
| 5,857,116 A | 1/1999 | Ayash et al. | |
| 5,867,642 A | 2/1999 | Vivio et al. | |
| 5,909,696 A | 6/1999 | Reinhardt et al. | |
| 5,913,058 A * | 6/1999 | Bonola | 713/2 |
| 6,026,472 A | 2/2000 | James et al. | |
| 6,125,450 A | 9/2000 | Kardach | |
| 6,175,890 B1 | 1/2001 | Yamaura | |
| 6,192,455 B1 * | 2/2001 | Bogin et al. | 711/154 |
| 6,339,808 B1 | 1/2002 | Hewitt et al. | |
| 6,381,682 B2 | 4/2002 | Noel et al. | |
| 6,453,278 B1 | 9/2002 | Favor et al. | |
| 6,658,515 B1 | 12/2003 | Larson et al. | |
| 6,694,401 B2 | 2/2004 | Nalawadi et al. | |
| 6,725,289 B1 | 4/2004 | Waldspurger et al. | |
| 6,751,679 B1 | 6/2004 | Arndt et al. | |
| 6,775,728 B2 | 8/2004 | Zimmer et al. | |
| 6,871,328 B1 | 3/2005 | Fung et al. | |
| 7,130,951 B1 | 10/2006 | Christie et al. | |
| 7,149,854 B2 | 12/2006 | Weber et al. | |
| 7,216,189 B2 | 5/2007 | Berlin | |
| 7,418,584 B1 * | 8/2008 | Klaiber et al. | 712/229 |
| 7,426,657 B2 | 9/2008 | Zorek, Sr. et al. | |
| 7,464,211 B2 | 12/2008 | Shah | |
| 7,496,966 B1 | 2/2009 | McGrath et al. | |
| 7,610,426 B1 * | 10/2009 | Dunn | 710/267 |
| 7,797,555 B2 | 9/2010 | Zmudzinski et al. | |
| 2001/0052056 A1 | 12/2001 | Acton et al. | |

(Continued)

FOREIGN PATENT DOCUMENTS

DE 4342220 6/1994
EP 617364 9/1994

(Continued)

OTHER PUBLICATIONS

"MultiProcessor Specification", Verisoin 1.4, May 1997, Intel Corporation, p. 3-12.

(Continued)

*Primary Examiner* — Amare F Tabor

(57) ABSTRACT

A method, an x86 processor and a computer system for processing more securely. More specifically, embodiments provide an effective and efficient mechanism for reducing APIC interference with accesses to SMRAM, where processor modifications implementing this mechanism effectively reduce APIC attacks and increase the security of proprietary, confidential or otherwise secure data stored in SMRAM.

33 Claims, 7 Drawing Sheets

(56) References Cited

U.S. PATENT DOCUMENTS

| | | |
|---|---|---|
| 2003/0028781 A1 | 2/2003 | Strongin |
| 2003/0084256 A1 | 5/2003 | McKee |
| 2003/0126349 A1* | 7/2003 | Nalawadi et al. ............ 711/2 |
| 2004/0117562 A1 | 6/2004 | Wu et al. |
| 2004/0123090 A1 | 6/2004 | Zimmer et al. |
| 2005/0097384 A1 | 5/2005 | Uehara et al. |
| 2005/0182879 A1 | 8/2005 | Vu |
| 2006/0277356 A1 | 12/2006 | Speier et al. |
| 2007/0186023 A1 | 8/2007 | Ho |
| 2008/0114916 A1 | 5/2008 | Hummel et al. |
| 2008/0222365 A1 | 9/2008 | Szewerenko et al. |
| 2009/0144510 A1 | 6/2009 | Wibling et al. |
| 2010/0016963 A1 | 1/2010 | Park |
| 2010/0122077 A1 | 5/2010 | Durham |

FOREIGN PATENT DOCUMENTS

| | | |
|---|---|---|
| EP | 1357454 | 10/2003 |
| GB | 2259166 | 3/1993 |
| JP | 06095769 | 4/1994 |
| JP | 2005128591 | 5/2005 |
| WO | 9918511 | 4/1999 |

OTHER PUBLICATIONS

Final OA Dated Oct. 10, 2008; U.S. Appl. No. 11/479,703.
Non Final OA Dated Feb. 13, 2009; U.S. Appl. No. 11/479,703.
Non Final OA Dated May 21, 2008; U.S. Appl. No. 11/479,703.
Restriction Requirement Dated Mar. 5, 2008; U.S. Appl. No. 11/479,703.
Non Final OA Dated Sep. 29, 2008; U.S. Appl. No. 11/644,224.
Notice of Allowance Dated Feb. 27, 2009; U.S. Appl. No. 11/644,224.
Duflot et al., "Using CPU System Management Mode to Circumvent Operating System Security Functions", Apr. 20, 2006, LRI, Universite de Paris Sud, pp. 1-15, retrieved from the Internet on May 7, 2008 at http://www.ssi.gouv.fr/fr/sciences/fichiers/lti/cansecwest2006-duflot-paper.pdf.
Non-Final Office Action Dated Jun. 15, 2009; U.S. Appl. No. 11/479,703.
Notice of Allowance Dated Jun. 22, 2009; U.S. Appl. No. 11/644,224.
Office Action Mailed Oct. 22, 2009; U.S. Appl. No. 11/479,703.
Final Office Action Dated Feb. 17, 2010; U.S. Appl. No. 11/479,703.
Sriprasad, et al., "Dynamic Software Reconfiguration Using System-Level Management," Nov. 5-9, 1995, IEEE, 14th Digital Avionics Systems Conference, pp. 336-341.
Liu, et al., "Application Research of Trusted Computing Platform in Electric Power Information System," May 30-31, 2010, IEEE, 2010 2nd International Conference on Networking and Digital Society (ICNDS), vol. 1, pp. 212-215.
Azab, et al., "HyperSentry: Enabling Stealthy In-Context Measurement of Hypervisor Integrity", Oct. 4-8, 2010, ACM, 17th ACM Conference on Computer and Communications Security, pp. 38-49.
Gardner, et al., "Detecting Code Alteration by Creating a Temporary Memory Bottleneck," Dec. 2009, IEEE, IEEE Transactions on Information Forensics and Security, vol. 4, No. 4, pp. 638-650.
Final Office Action, Mail Date Aug. 25, 2010, U.S. Appl. No. 11/479,703.
Advisory Action, Mail Date Oct. 12, 2010, U.S. Appl. No. 11/479,703.
Notice of Allowance, Mail Date Dec. 3, 2010, U.S. Appl. No. 11/479,703.
Non Final Office Action; Mail Date May 21, 2010; U.S. Appl. No. 11/479,703.

* cited by examiner

PROCESSOR MODIFICATIONS TO INCREASE COMPUTER SYSTEM SECURITY

RELATED APPLICATIONS

The present application is related to U.S. patent application Ser. No. 11/479,703, filed Jun. 29, 2006, entitled "PROCESSOR AND NORTHBRIDGE MODIFICATIONS TO INCREASE COMPUTER SYSTEM SECURITY," naming David A. Dunn as the inventor, assigned to the assignee of the present invention. That application is incorporated herein by reference in its entirety and for all purposes.

The present application is related to U.S. patent application Ser. No. 11/644,224, filed Dec. 22, 2006, entitled "SYSTEM MANAGEMENT MODE CODE MODIFICATIONS TO INCREASE COMPUTER SYSTEM SECURITY," naming David A. Dunn as the inventor, assigned to the assignee of the present invention. That application is incorporated herein by reference in its entirety and for all purposes.

BACKGROUND OF THE INVENTION

Most all modern central processing units, namely those based on the x86 architecture, employ system management random access memory (SMRAM) to carry out trusted system management mode (SMM) operations. While in SMM, the processor can execute code and access data held in an area of system memory known as SMRAM. SMRAM is protected from all operating system and device accesses. As such, in reliance upon the privileged nature of SMM, developers continue to place increasing amounts of secure data within SMRAM.

In addition to SMRAM, most modern CPUs also utilize a local advanced programmable interrupt controller (APIC) for managing CPU interrupts. Most APICs are implemented within the CPU and mapped to physical memory, where the APIC mapping may be moved within physical memory by altering a base address (e.g., "APICBASE") within the APICBASE model specific register of the processor. This APICBASE register can be written even when the processor is not running in SMM. As such, an unauthorized user may utilize the APIC to attack a computer system running in SMM by moving the APIC mapping over SMRAM, thereby derailing SMRAM requests and forcing trusted SMM code to read different values than it previously wrote. Additionally, unauthorized users may place the APIC mapping over code stacks within physical memory to jump out of SMRAM upon return from SMM subroutines, thereby enabling the mounting of larger attacks.

SUMMARY OF THE INVENTION

Accordingly, a need exists to improve the security of processors utilizing SMRAM and an APIC. Additionally, a need exists to reduce the ability of the APIC to compromise the security of SMRAM and SMM operation. Furthermore, a need exists to modify existing processor designs to reduce APIC interference with accesses to SMRAM.

Embodiments of the present invention are directed to a method, an x86-compliant processor and a computer system for processing more securely. More specifically, embodiments provide an effective and efficient mechanism for reducing APIC interference with accesses to SMRAM, where processor modifications implementing this mechanism effectively reduce APIC attacks and increase the security of proprietary, confidential or otherwise secure data stored in SMRAM.

In one embodiment of the present invention, a method for increasing the security of a processor includes utilizing a plurality of registers to track the location of a portion of SMRAM. When in SMM and upon determining that an address of a request refers to the portion of SMRAM, interference of an APIC with accesses to the SMRAM is reduced.

In another embodiment of the present invention, an x86-compliant processor for processing more securely includes a routing component for enabling said processor to route a request. A first plurality of registers are implemented for tracking a location of a portion of SMRAM, wherein the first plurality of registers are accessible by the routing component. The processor also includes an APIC coupled to the routing component. Additionally, a plurality of logic components are coupled to the routing component for reducing interference of the APIC with accesses to the SMRAM, wherein the interference is reduced when the processor is in SMM and upon a determination that an address of a request refers to the portion of SMRAM.

In yet another embodiment of the present invention, a computer system for processing more securely includes a processor as described above. Additionally, a bridge component is coupled to the processor by a frontside bus. A memory is coupled to the bridge component, wherein the memory comprises the SMRAM. Furthermore, the frontside bus is operable to convey the request to the bridge component, and wherein the bridge component is operable to route the request to the memory.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
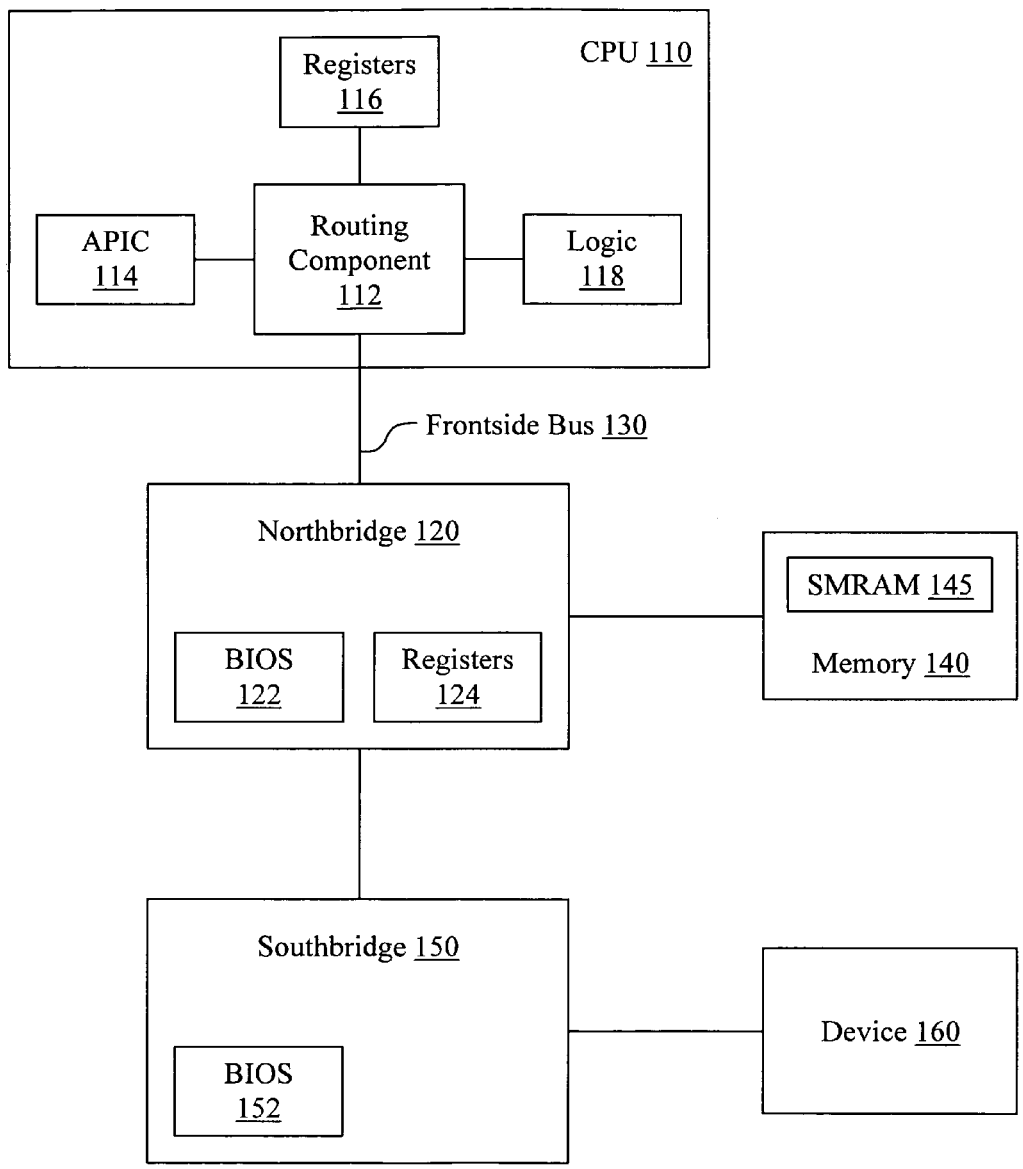
FIG. 1 shows a block diagram of an exemplary computer system for processing more securely in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "writing," "identifying," "defining," "determining," "performing," "processing," "comparing," "repeating," "creating," "modifying," "moving," "establishing," "using," "calculating," "accessing," "generating," "limiting," "copying," "utilizing," "reducing," "tracking," "routing," "updating," "snooping," "preventing," "storing," "enabling," "disabling," "allowing," "denying," "handling," "transferring," "mapping," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

EMBODIMENTS OF THE INVENTION

FIG. 1 shows a block diagram of exemplary computer system 100 for processing more securely in accordance with one embodiment of the present invention. As shown in FIG. 1, x86-compliant central processing unit (CPU) 110 is coupled to northbridge 120 via frontside bus 130. Northbridge 120 enables CPU 110 to communicate with memory 140, where memory 140 comprises system management random access memory (SMRAM) 145. Southbridge 150 is coupled to northbridge 120, thereby enabling CPU 110 to communicate with device 160.

As depicted in FIG. 1, CPU 110 comprises routing component 112 coupled to local advanced programmable interrupt controller (APIC) 114. However, in contrast to conventional x86 processors, CPU 110 comprises additional components to reduce the ability of APIC 114 to compromise the security of SMRAM 145 and system management mode (SMM) operation of CPU 110. Specifically, CPU 110 is modified to include registers 116 coupled to routing component 112 to track the location, size and/or enabled status of SMRAM. Additionally, logic 118 is also coupled to routing component 112 to reprioritize SMRAM above the APIC, thereby reducing APIC interference with accesses to SMRAM when in SMM. As such, CPU 110 may effectively reduce APIC attacks and increase the security of proprietary, confidential or otherwise secure data stored in SMRAM 145.

Although computer system 100 is depicted in FIG. 1 as having only a single processor, is should be appreciated that computer system 100 may comprise two or more processors. Additionally, although CPU 110 is depicted in FIG. 1 as having only one routing component (e.g., 112), it should be appreciated that CPU 110 may have two or more routing components in other embodiments, where the multiple routing components may be coupled with one or more APICs corresponding to one or more of the routing components. Similarly, computer system 100 may utilize additional memory components, which may comprise SMRAM. As such, SMRAM may be spread amongst more than one memory module in other embodiments.

CPU 110 may track the location of SMRAM 145 using registers 116, which is important to reducing APIC interference with accesses to SMRAM during SMM. Registers 116 may contain any form of data enabling the CPU to determine and/or approximate the location of SMRAM. For example, registers 116 may contain an address indicating the top of SMRAM (e.g., TOM) and/or an address indicating the bottom of SMRAM (e.g., TOM minus TSEG). Alternatively, one or more intermediate addresses indicating the location of SMRAM may be stored within registers 116. Moreover, it should be appreciated that alternate means may be used to locate SMRAM (e.g., by storing an extent of SMRAM on one or both sides of a given address within physical memory, etc.).

Registers 116 may also be used to store data indicating whether SMRAM 145 is enabled or disabled. Although a flag within registers 116 may be toggled to indicate the enabled status of SMRAM 145, other means may be used.

Although registers 116 are depicted in FIG. 1 as a single register, it should be appreciated that registers 116 may contain one or more registers. Registers 116 may be model specific registers (MSRs) or non-MSRs, or a combination of the two. Additionally, although registers 116 are depicted as a separate component from routing component 112, they may also be integrated within routing component 112. Moreover, it should be appreciated that the location, size and/or enabled status of SMRAM may be stored within a single register, or rather each within a separate register. Further, the location, size and/or enabled status of SMRAM may span more than one register.

Once CPU 110 determines the location of SMRAM 145, logic 118 may be used to reduce interference of APIC 114 with accesses to SMRAM. For example, if it is determined that the address of a request falls within an address range corresponding to SMRAM, routing component 112 may decide to route requests away from APIC 114 and instead toward northbridge 120 on frontside bus 130. As such, the hardware configuration of CPU 110 as depicted in FIG. 1 enables routing component 112 to intelligently route requests knowing the location of SMRAM. In another embodiment, CPU 110 may access both the location and enabled status of SMRAM to further enhance routing capabilities.

Although the logic enhancements to CPU 110 may be implemented in alternative fashions, the following is exemplary coded logic that may be performed by logic 118 to reduce interference of APIC 114 with accesses to SMRAM 145:

```
if (paddr in SMRAM) && (SMRAM enabled) && (processor in SMM) {route request to northbridge
    //northbridge then routes to SMRAM based on paddr}
else if ((paddr is on APIC page) && (request is not code fetch) {route request to local APIC}
else {
route request to northbridge
    //northbridge then routes to SMRAM, DRAM, or a device based on
    //paddr and settings in northbridge}
```

Accordingly, in one embodiment, CPU 110 may route requests to northbridge 120 if the address of the request falls within a range of SMRAM determined or approximated by CPU 110 (e.g., by accessing a register of registers 116 containing information relating to the location of SMRAM), SMRAM is enabled (e.g., by accessing a register of registers 116 containing information about the enabled status of SMRAM 145), and CPU 110 is in SMM. The northbridge may then route the request to SMRAM. If any of these conditions is not met, CPU 110 may route the request to APIC 114 if the address of the request is on the memory page to which the APIC is mapped and the request is not a code fetch (e.g., is instead a read, write, etc.). If any of these conditions are not met, the request may be routed by CPU 110 to northbridge 120 for subsequent routing to devices or components of the computer system (e.g., SMRAM, DRAM, etc.) based upon the address of the request and settings within the northbridge.

Although logic 118 is depicted in FIG. 1 as a separate component from routing component 112, it should be appreciated that logic 118 may also be integrated within routing component 112. Additionally, although logic 118 is depicted in FIG. 1 as a single component, logic 118 may comprise more than one functional block which operate together to effectively reduce interference of APIC 114 with accesses to SMRAM 145.

As discussed thus far, CPU 110 incorporates logic to reduce APIC interference with accesses to SMRAM, where SMRAM is determined or approximated to lie in one or more address ranges within physical memory (e.g., 140). Additionally, embodiments of the present invention provide processor enhancements to track the location and/or enabled status of SMRAM when relocated or enabled/disabled. Given that registers 124 within northbridge 120 may contain information as to a current location and/or enabled status of SMRAM 145, this information may be used to update and/or synchronize registers 116 to contain information enabling CPU 110 to then determine or approximate the current location of SMRAM 145 and whether SMRAM 145 is currently enabled or disabled.

In one embodiment, registers 116 may be updated using basic input/output system (BIOS) firmware located within either BIOS 122 of northbridge 120 or BIOS 152 of southbridge 150, where BIOS 122 and/or 152 may be read only memory, random access memory, etc. The BIOS firmware can be enhanced to program an updated location of SMRAM into registers 116 (e.g., using a write to model specific register (WRMSR) instruction) upon detecting an SMRAM relocation. Similarly, the enabled status of SMRAM 145 may be programmed into registers 116 upon detecting a change in the enabled state of SMRAM 145. In one embodiment, this updating or synchronizing may be performed when the BIOS firmware is writing an updated SMRAM location and/or enabled status to registers 124 using configuration cycles (e.g., via the 0xcfc and/or 0xcf8 ports).

In another embodiment, logic of CPU 110 can be enhanced to watch for updates to registers 124 relating to the location, size and/or enabled status of SMRAM 145. For example, CPU 110 may snoop ports related to configuration cycles used to update registers 124 (e.g., the 0xcfc and/or 0xcf8 ports), thereby enabling CPU 110 to update registers 116 to track the location/size and/or enabled status of SMRAM 145.

In yet another embodiment, frontside bus 130 can be enhanced to allow northbridge 120 to send information back to CPU 110 regarding any changes to the location, size and/or enabled status of SMRAM 145. Northbridge 120 may also be enhanced to transfer this information (e.g., via data packets) upon detecting an update to registers 124. CPU 110 can also be enhanced to accept and interpret the data packets such that registers 116 may be updated and/or synchronized with registers 124 accordingly.

Figure 2:
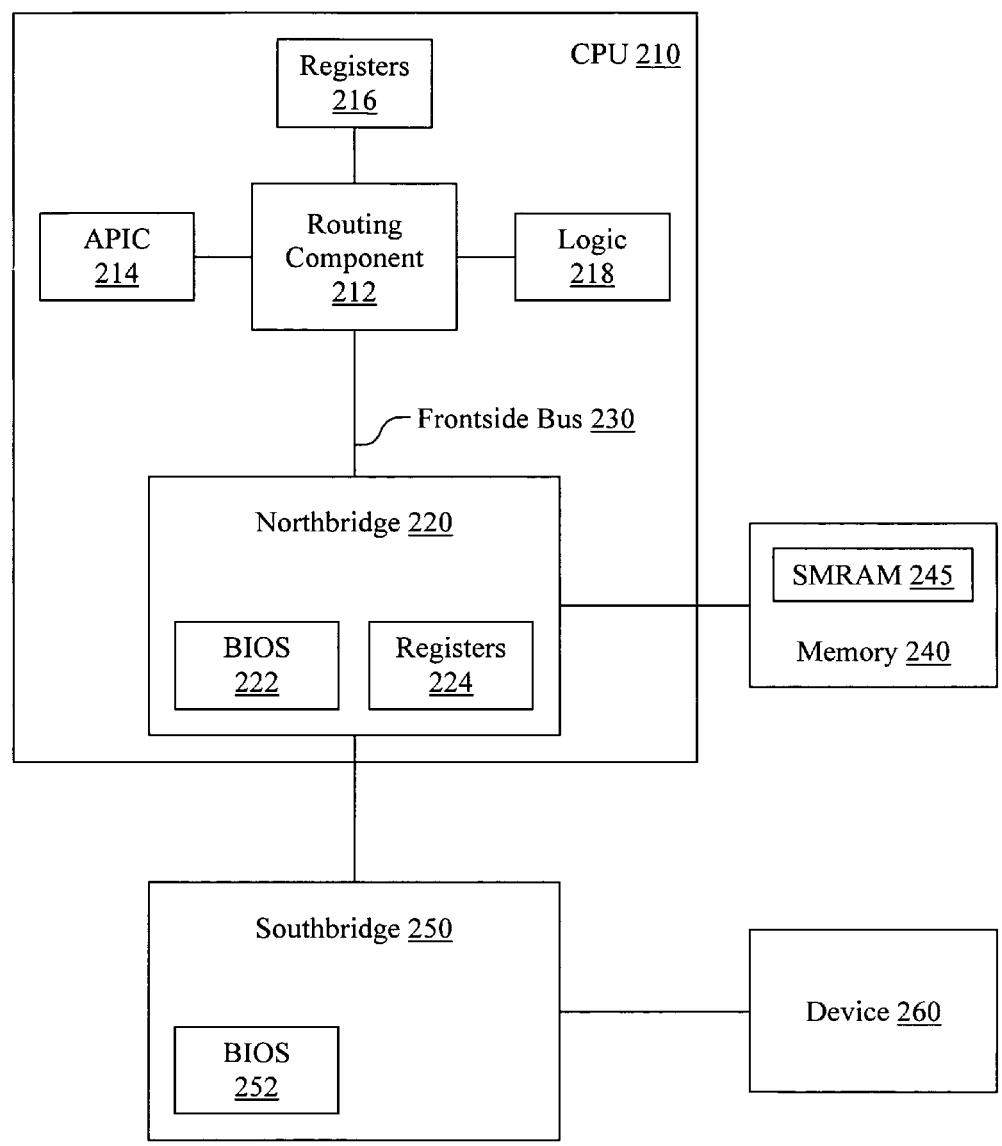
FIG. 2 shows a block diagram of an exemplary computer system with a processor-integrated northbridge for processing more securely in accordance with one embodiment of the present invention.

FIG. 2 shows a block diagram of exemplary computer system 200 with a processor-integrated northbridge for processing more securely in accordance with one embodiment of the present invention. As shown in FIG. 2, computer system 200 is similar to computer system 100, except for the incorporation of northbridge 220 and frontside bus 230 into x86-compliant CPU 210. As such, CPU 210 comprises routing component 212 coupled to APIC 214. And in contrast to conventional x86 processors, CPU 210 comprises additional components to reduce the ability of APIC 214 to compromise the security of SMRAM 245 and the SMM operation of CPU 210. Specifically, CPU 210 is modified to include registers 216 coupled to routing component 212 to track the location, size and/or enabled status of SMRAM. Additionally, logic 218 is also coupled to routing component 212 to reprioritize SMRAM above the APIC, thereby reducing APIC interference with accesses to SMRAM when in SMM. As such, CPU 210 may effectively reduce APIC attacks and increase the security of proprietary, confidential or otherwise secure data stored in SMRAM 245 similar to computer system 100 as discussed above with respect to FIG. 1.

Given that northbridge 220 is incorporated within CPU 210, memory 240 and southbridge 250 are shown coupled to CPU 210. As such, CPU 210 is able to communicate with memory 240 and device 260 utilizing northbridge 220 and southbridge 250, respectively.

As described above with respect to FIG. 1, CPU 210 like CPU 110 can be enhanced to update and/or synchronize registers 224 with registers 216 to enable CPU 210 to track the location, size and/or enabled status of SMRAM 245 within memory 240. As such, either BIOS 222 within northbridge 220 or BIOS 252 within southbridge 250 may be used to perform the updating and/or synchronizing similar to BIOS 122 and 152 of FIG. 1 discussed above. Additionally, CPU 210 can be enhanced to snoop ports related to configuration cycles used to update registers 224 with regard to SMRAM 245, similar to CPU 110. Further, frontside bus 230, northbridge 220 and CPU 210 can be enhanced to send information about SMRAM 245 to update registers 216 upon detecting an update to registers 224 similar to the discussion above with respect to FIG. 1.

Figure 3:
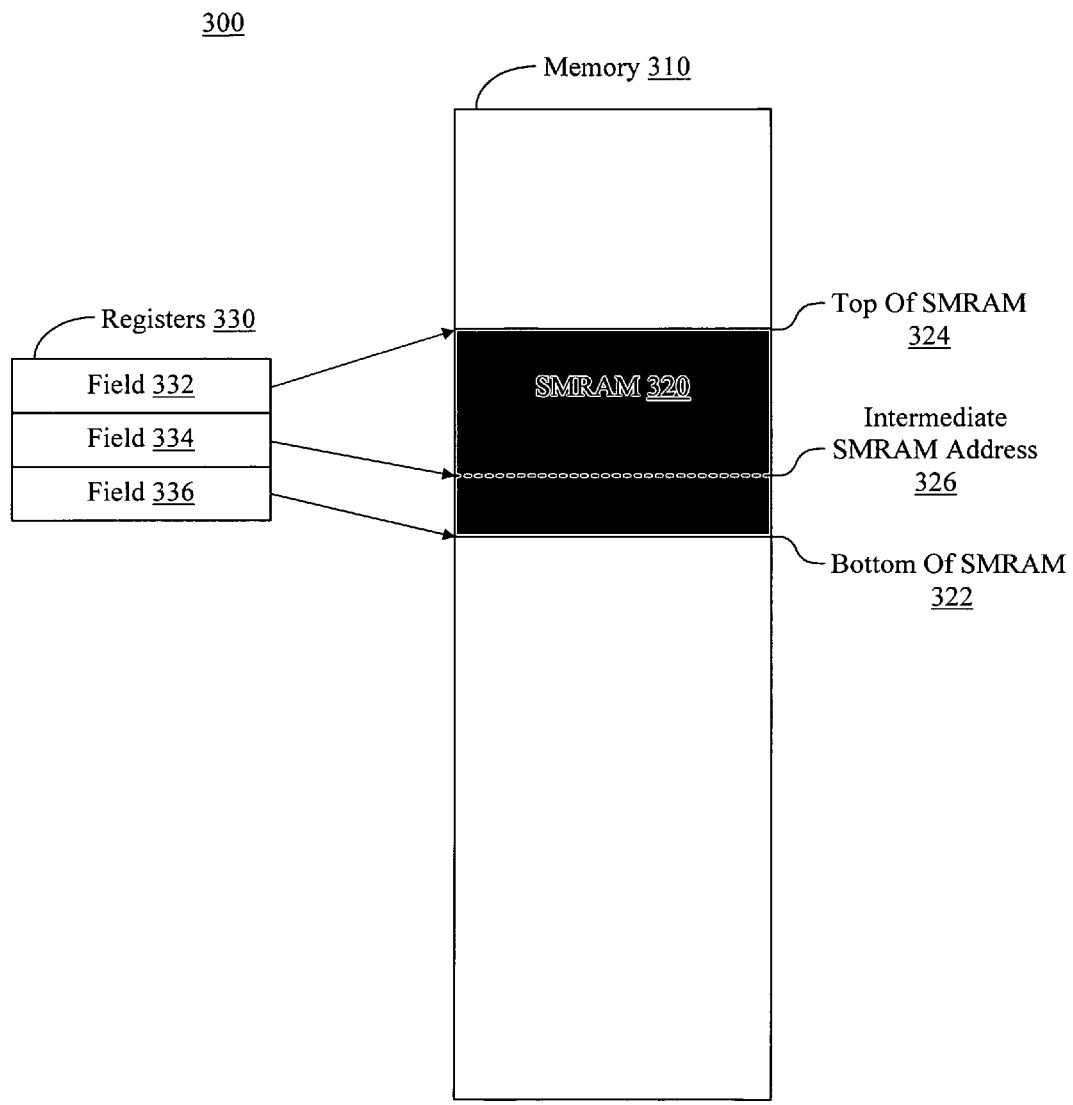
FIG. 3 shows a block diagram depicting SMRAM in memory in accordance with one embodiment of the present invention.

FIG. 3 shows block diagram 300 depicting SMRAM 320 in memory 310 in accordance with one embodiment of the present invention. As shown in FIG. 3, memory 310 may be physical memory (e.g., 140 and/or 240) accessible by a processor (e.g., 110 and/or 210) of a computer system (e.g., 100 and/or 200). Accordingly, a portion of memory 310 may be designated as SMRAM (e.g., 145 and/or 245). For example, SMRAM 320 occupies a portion of memory 310 between addresses bottom of SMRAM 322 and top of SMRAM 324.

To effectively reduce APIC attacks by reducing APIC interference with accesses to SMRAM, a processor may track the location and/or size of SMRAM. As shown in FIG. 3, registers 330 may be used by a processor to track the location of SMRAM 320 within memory 310, where the registers comprise a number of fields. Specifically, field 332 contains information (e.g., a pointer) to top of SMRAM 234, and field 336 contains information about bottom of SMRAM 322. As such, the processor may then determine that SMRAM 320 lies in memory 310 between the addresses bottom of SMRAM 322 and top of SMRAM 324.

Alternatively, the processor may estimate the location and/or size of SMRAM 320 by using one or more known addresses (e.g., stored in registers 330) and information about the extent of SMRAM on either side of the known address or addresses. For example, if the processor knows that SMRAM is roughly 64 kilobytes in length and can access field 336 of registers 330 to determine or estimate bottom of SMRAM 322, the processor can determine top of SMRAM by adding 64 kilobytes to bottom of SMRAM 322. Additionally, the processor may access field 334 of registers 330 to determine intermediate SMRAM address 326. Provided the processor can estimate the extent of SMRAM on either side of intermediate SMRAM address 326 (e.g., 44 kilobytes above and 20 kilobytes below), the processor can determine or approximate the location and/or size of SMRAM.

Registers 330 may comprise one or more registers (e.g., 116 and/or 126) within a processor (e.g. 110 and/or 210) for tracking the size and/or location of SMRAM. As such, registers 330 may be MSRs or non-MSRs. Additionally, although fields 332, 334 and 336 are shown as contiguous fields, it should be appreciated that the fields may be non-contiguous fields with the same or different registers. And although fields 332, 334 and 336 all point to locations representing a contiguous SMRAM block within the same memory (e.g., 310), it should be appreciated that SMRAM may be spread over multiple locations of one or more memories. As such, the fields of registers 330 may point to one or more locations within the same memory, or instead to locations within two or more memories.

Figure 4:
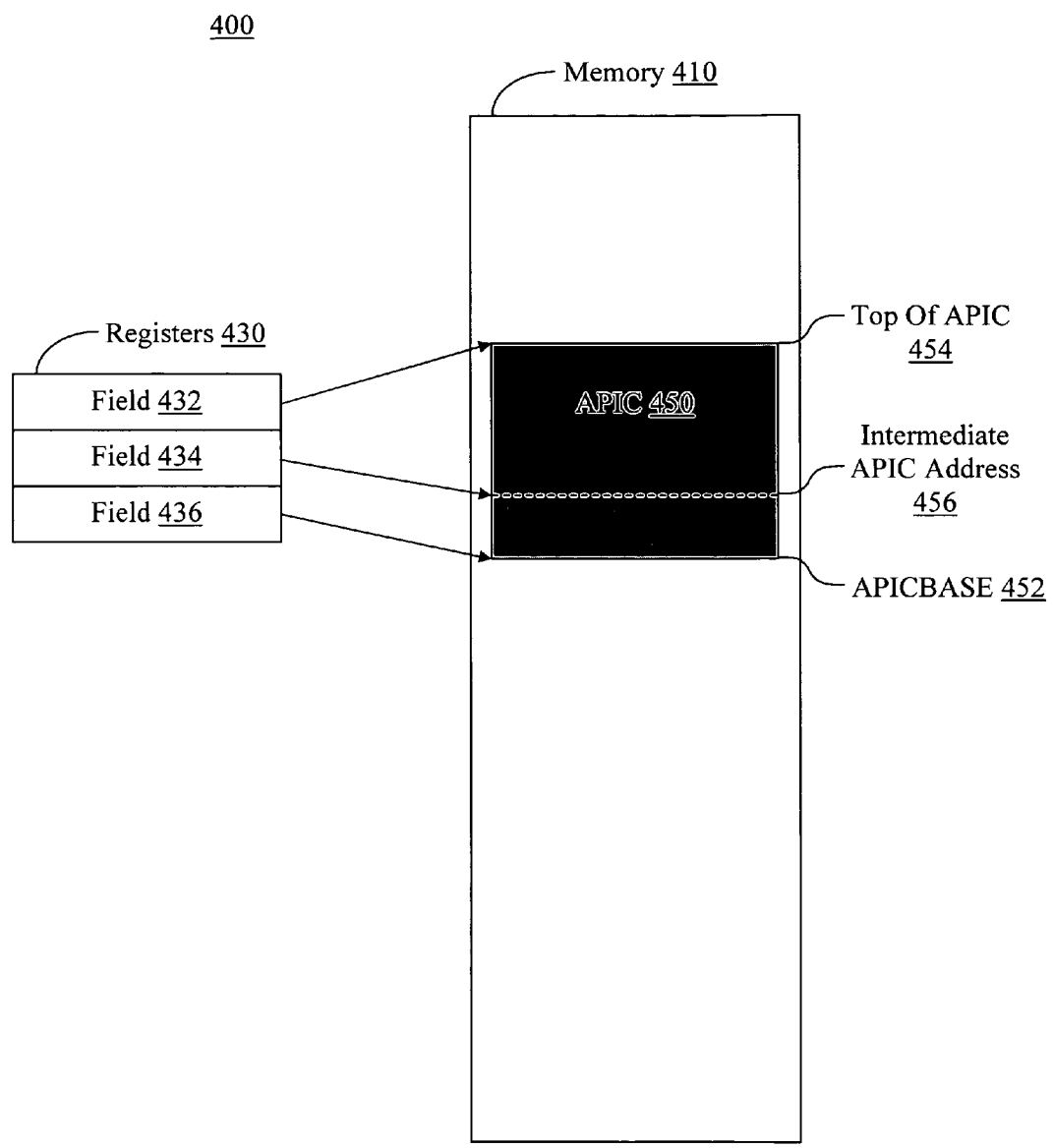
FIG. 4 shows a block diagram depicting a memory mapping of an APIC in accordance with one embodiment of the present invention.

FIG. 4 shows block diagram 400 depicting a memory mapping of APIC 450 in accordance with one embodiment of the present invention. As shown in FIG. 4, memory 410 may be physical memory (e.g., 140 and/or 240) accessible by a processor (e.g., 110 and/or 210) of a computer system (e.g., 100 and/or 200). Accordingly, an APIC (e.g., 114 and/or 214) may be mapped to a portion of memory 410. For example, APIC 450 is mapped to a portion of memory 410 between addresses APICBASE 452 and top of APIC 454.

To effectively reduce APIC attacks by reducing APIC interferences with accesses to SMRAM, a processor may track the location and/or size of APICs. As shown in FIG. 4, registers 430 may be used by a processor to track the location of APIC 450 within memory 410, where the registers comprise a number of fields. Specifically, field 432 contains information (e.g., a pointer) to top of APIC 454, and field 436 contains information about APICBASE 452. As such, the processor may then determine that APIC 450 is mapped to memory 410 between the addresses APICBASE 452 and top of APIC 454.

Alternatively, the processor may estimate the location and/or size of the mapping of APIC 450 by using one or more known addresses (e.g., stored in registers 430) and information about the extent of the APIC mapping on either side of the known address or addresses. For example, if the processor knows that the APIC mapping is roughly 4 kilobytes in length and can access field 436 of registers 430 to determine or estimate APICBASE 452, the processor can determine top of APIC by adding 4 kilobytes to APICBASE 452. Additionally, the processor may access field 434 of registers 430 to determine intermediate APIC address 456. Provided the processor can estimate the extent of the APIC mapping on either side of intermediate APIC address 456 (e.g., 2500 bytes above and 1500 bytes below), the processor can determine or approximate the location and/or size of the APIC mapping.

Registers 430 may comprise one or more registers (e.g., 116 and/or 126) within a processor (e.g. 110 and/or 210) for tracking the size and/or location of an APIC mapping. As such, registers 430 may be MSRs or non-MSRs. Additionally, although fields 432, 434 and 436 are shown as contiguous fields, it should be appreciated that the fields may be non-contiguous fields with the same or different registers. And although fields 432, 434 and 436 all point to locations representing a contiguously-mapped APIC block within the same memory (e.g., 410), it should be appreciated that the APIC mapping may be spread over multiple locations of one or more memories. As such, the fields of registers 430 may point to one or more locations within the same memory, or instead to locations within two or more memories.

Figure 5:
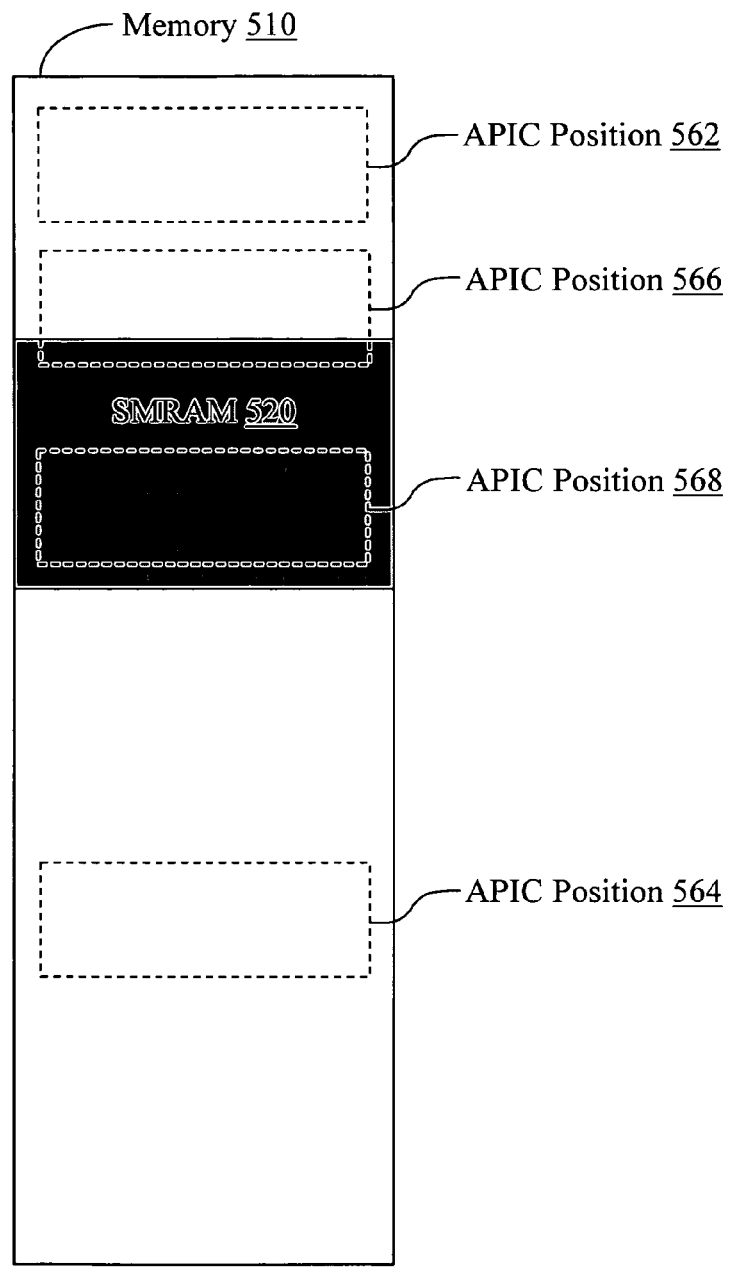
FIG. 5 shows a block diagram depicting various locations of an APIC memory mapping in accordance with one embodiment of the present invention.

FIG. 5 shows block diagram 500 depicting various locations of an APIC memory mapping in accordance with one embodiment of the present invention. As shown in FIG. 5, memory 510 may be physical memory (e.g., 140 and/or 240) accessible by a processor (e.g., 110 and/or 210) of a computer system (e.g., 100 and/or 200). Accordingly, a portion of memory 510 may be designated as SMRAM (e.g., 145 and/or 245) as discussed above with respect to FIG. 3.

Referring back to FIG. 4, APIC 450 represented a memory mapping of an APIC of a processor, whose position within memory 410 may be defined by top of APIC 454, intermediate APIC address 456 and/or APICBASE 452. Accordingly, the location of APIC 450 may be adjusted within memory 410 by altering one of the address values within registers 430.

Turning again to FIG. 5, four different APIC mapping positions are shown, which may be determined by adjusting register values indicating addresses within physical memory to which an APIC is mapped. For example, APIC position 562 represents an APIC mapped above SMRAM 520 with no overlap, while APIC position 564 represents an APIC mapped below SMRAM with no overlap. While APIC positions 562 and 564 do not overlap SMRAM 520, the APIC may be mapped over SMRAM in other embodiments. For example, APIC position 566 represents an APIC mapped with some overlap of SMRAM 520, and APIC position 568 represents an APIC mapped within SMRAM 520.

As discussed above with respect to FIGS. 1 and 2, embodiments of the present invention improve the security of processing by reducing interference of the APIC with accesses to SMRAM. Since the APIC is mapped to physical memory and can overlap SMRAM (e.g., APIC positions 566 and 568), the APIC presents a security threat if allowed to intercept or otherwise interfere with accesses to SMRAM as SMM code is then forced to read values other than those that were previously written. However, embodiments neutralize such attacks by reducing and/or preventing APIC interference with accesses to SMRAM, which effectively allows trusted memory accesses to "see through" an overlapping and malicious APIC mapping.

Figure 6:
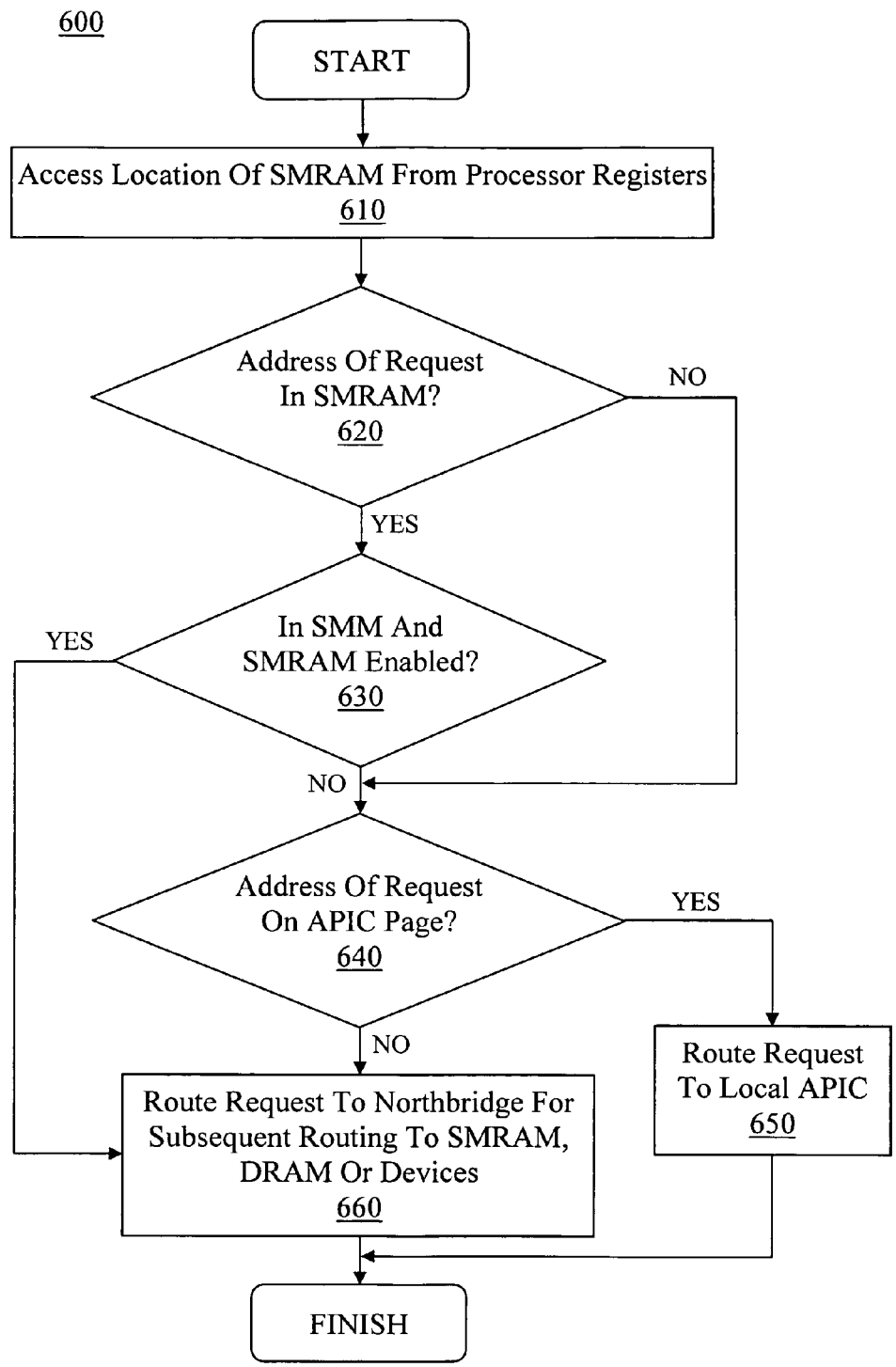
FIG. 6 shows a computer-implemented process for processing more securely in accordance with one embodiment of the present invention.

FIG. 6 shows computer-implemented process 600 for processing more securely in accordance with one embodiment of the present invention. As shown in FIG. 6, step 610 involves accessing a current location of SMRAM from a processor register (e.g., 116, 216 and/or 330). The current location may be determined by one or more accesses to a plurality of registers to determine or approximate an address range of SMRAM as described above with respect to FIG. 3. Additionally, step 610 may be performed in response to the receipt of a request to access memory (e.g., read, write, code fetch, etc.).

Once the location of SMRAM is accessed, a determination of whether the address of the request is within SMRAM is performed in step 620. Accordingly, the address of the request is compared to the address range determined or approximated in step 610. Although a strict comparison may be made in step 620, it should be appreciated that a looser comparison may be made (e.g., to account for approximation error) using either a predetermined tolerance or a tolerance generated on the fly for the address range of SMRAM. As such, if it is determined that the address of the request is not in SMRAM, then step 640 may be performed. Alternatively, if it is determined that the address of the request is within SMRAM, then step 630 may be performed.

As shown in FIG. 6, step 630 involves determining whether the processor is in SMM and whether SMRAM is enabled. Given that SMM is an operating mode of the processor and that SMM code accesses SMRAM during SMM, it is appreciated that such determinations may be made in a variety of manners (e.g., through register accesses, microcode parsing, etc.). Additionally, it may be determined that the processor enters SMM at various points during the transition from non-SMM operation to SMM operation (e.g. upon detecting a system management interrupt (SMI), before saving the processor state, after saving the processor state, etc.) such that APIC interference with accesses to SMRAM may be reduced appropriately to improve the security of processing. Similarly, the conclusion of SMM may be determined at various points during the transition from SMM operation to non-SMM operation (e.g. before restoring processor state, after restoring processor state, until a resume (RSM) instruction is completed, etc.).

Therefore, if it is determined that both the processor is in SMM and SMRAM is enabled in step 630, then the request may be routed to the northbridge (e.g., 120 and/or 220) for subsequent routing to SMRAM, DRAM or devices in step 660. As shown in FIGS. 1 and 2, the request may be transmitted over frontside bus 130 and/or 230 from the CPU to the northbridge. Alternatively, if it is determined that either the processor is not in SMM or the SMRAM is not enabled, then step 640 may be performed.

As shown in FIG. 6, step 640 involves determining whether a request targets an address on the memory page to which the APIC is mapped (e.g., 450). If it is determined that the request is associated with an address on the APIC page, then the request is routed to the local APIC (e.g., 114 and/or 214). However, if it is determined that the request is not associated with an address on the memory page to which the APIC is mapped, then step 660 may be performed.

Thus, embodiments increase computer system security by limiting APIC interference with accesses to SMRAM. Specifically, by enhancing the processor to track the location of SMRAM (e.g., with registers 116, 216 and/or 330), routing logic (e.g., as represented by process 600) can effectively reduce the ability of the APIC to intercept processor requests intended for SMRAM, where such requests are instead routed to the northbridge (e.g., 120 and/or 220) for further routing to SMRAM, DRAM or devices.

Figure 7:
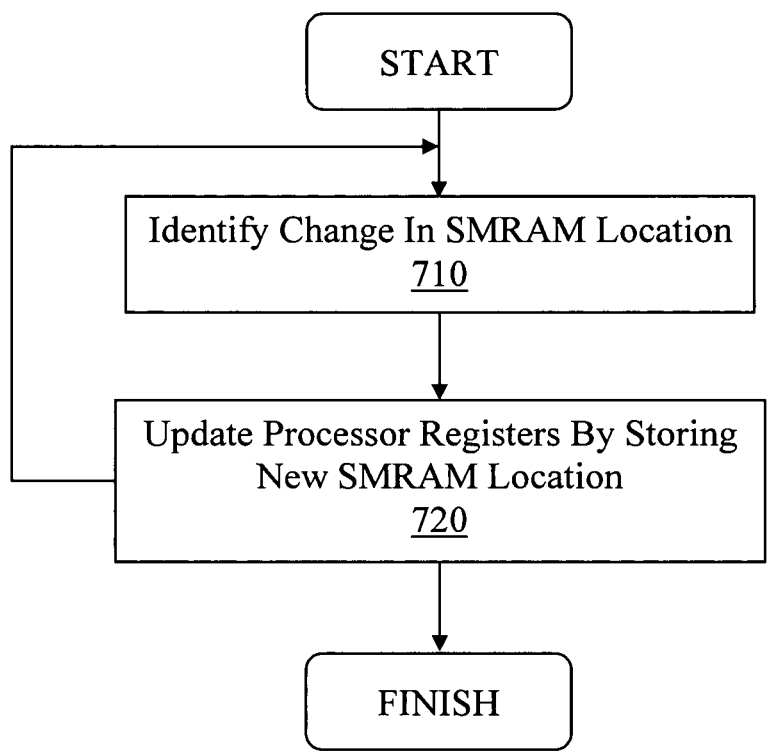
FIG. 7 shows a computer-implemented process for tracking SMRAM location within a processor in accordance with one embodiment of the present invention.

FIG. 7 shows computer-implemented process 700 for tracking SMRAM location within a processor in accordance with one embodiment of the present invention. As shown in FIG. 7, step 710 involves identifying a change in the location of SMRAM. Although a computer system performing process 700 may identify a change in SMRAM location using various means, the processor and/or northbridge may detect such a relocation (e.g., upon writing a new location to one or more northbridge registers).

After identifying a change in SMRAM location, the processor registers (e.g., 116 and/or 216) may be updated with the new SMRAM location in step 720. The updating may be performed in accordance with the discussion of FIGS. 1 and 2 above relating to updating and/or synchronizing the processor registers (e.g., 116 and/or 216) with the northbridge registers (e.g., 124 and/or 224). As such, the processor may effectively track the location of SMRAM such that APIC interference with accesses to SMRAM may be reduced to improve processing security (e.g., using process 600) in accordance with embodiments of the present invention.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method comprising:
   utilizing a first register to track a memory location associated with system management random access memory (SMRAM); and
   conditionally routing a request for a memory access, wherein said request comprises a memory address and is routed to said SMRAM in response to determining that a first set of conditions is satisfied, wherein said first set of conditions comprises determining that operation is in system management mode (SMM) with said SMRAM enabled and said address comprises said memory location, wherein said request is routed to an advanced programmable interrupt controller (APIC) in response to determining that said first set of conditions is not satisfied and that a second set of conditions is satisfied, wherein said second set of conditions comprises determining that said address refers to said APIC and said request is other than a code fetch, and wherein said request is routed to a destination based on said address in response to determining that said first set of conditions and said second set of conditions are not satisfied.

2. The method of claim 1 further comprising:
   tracking an enabled status of said SMRAM utilizing a second register.

3. The method of claim 2, wherein said first and second registers are located in a processor.

4. The method of claim 2, wherein said first and second registers share a common portion.

5. The method of claim 2, wherein said first and second registers comprise model specific registers.

6. The method of claim 5, wherein said model specific registers reference a length of said SMRAM.

7. The method of claim 1 further comprising:
   on condition that said request is a code fetch, routing said request to a bridge component coupled to a processor, wherein said bridge component is operable to route said request to said destination.

8. The method of claim 7, wherein said destination comprises said SMRAM.

9. The method of claim 7, wherein said destination comprises a component detachably coupled to said bridge component.

10. The method of claim 1 further comprising:
updating said memory location by writing an updated location to said first register.

11. The method of claim 10, wherein said updating is performed by basic input output system (BIOS) firmware in response to writing said updated location to a third register associated with a bridge component coupled to a processor.

12. The method of claim 10, wherein said updating is performed by a processor subsequent to writing said updated location to a third register associated with a bridge component coupled to said processor, and further comprising determining said updated location by snooping a port corresponding to said third register.

13. The method of claim 10, wherein said updating is performed by a processor subsequent to receipt of a plurality of data packets from a bridge component coupled to said processor, wherein said plurality of data packets enable said processor to determine said updated location.

14. The method of claim 1, wherein said first register is located in an x86 central processing unit.

15. A processor comprising:
a routing component operable for enabling said processor to route a request for a memory access, wherein said request comprises an address;
a first register operable for storing information associated with system management random access memory (SMRAM), wherein said SMRAM is delimited by two endpoints that define a range of addresses and wherein said information allows said processor to determine at least one of said endpoints and said range, wherein said first register is accessible by said routing component; and
an advanced programmable interrupt controller (APIC) coupled to said routing component; wherein said request is routed by said processor to said SMRAM while said processor is in system management mode (SMM) and on condition that said processor determines said address is within said range, wherein further said request is instead routed to said APIC on condition that said address refers to said APIC and said request is not a code fetch.

16. The processor of claim 15 further comprising a second register operable for tracking an enabled status of said SMRAM.

17. The processor of claim 15, wherein said request is routed to said SMRAM only on condition that said SMRAM is enabled.

18. The processor of claim 15, wherein said first and second registers share a common portion.

19. The processor of claim 15, wherein said first and second registers comprise model specific registers.

20. The processor of claim 15 further comprising a frontside bus operable for conveying said request to a bridge component on condition that said request is a code fetch, wherein said bridge component is operable to route said request to a destination based on said address.

21. The processor of claim 20, wherein said destination comprises said SMRAM.

22. The processor of claim 20, wherein said routing component is operable to update said information by writing an updated location to said first register, wherein said updating is performed subsequent to writing said updated location to a third register associated with said bridge component, and wherein said updated location is determined by snooping a port corresponding to said third register.

23. The processor of claim 20, wherein said routing component is operable to update said information by writing an updated location to said first register, wherein said updating is performed subsequent to receipt of a plurality of data packets from said bridge component, wherein said plurality of data packets enable said routing component to determine said updated location.

24. A computer system comprising:
a processor comprising:
a routing component operable for enabling said processor to route a request for a memory access, wherein said request comprises an address; and
a first register operable for tracking a memory location associated with system management random access memory (SMRAM), wherein said first register is accessible by said routing component; and
an advanced programmable interrupt controller (APIC) coupled to said routing component;
a bridge component coupled to said processor by a frontside bus; and
a memory coupled to said bridge component, wherein said memory comprises said SMRAM; wherein said frontside bus is operable to convey said request to said SMRAM on condition that said computer system is in system management mode (SMM) and said address refers to said SMRAM, wherein on condition that said request is not routed to said SMRAM then said request is routed to said APIC on condition that said address refers to said APIC and said request is other than a code fetch, and wherein on condition that said request is not routed to said APIC then said bridge component is operable to route said request to a destination based on said address.

25. The system of claim 24, wherein said processor further comprises a second register to track an enabled status of said SMRAM.

26. The system of claim 24, wherein said request is routed to said SMRAM only on condition that said SMRAM is enabled.

27. The system of claim 25, wherein said first and second registers share a common portion.

28. The system of claim 25, wherein said first and second registers comprise model specific registers.

29. The system of claim 28, wherein said model specific registers reference a length of said SMRAM.

30. The system of claim 24 further comprising a component coupled to said CPU for storing basic input output system (BIOS) firmware, wherein said BIOS firmware is operable to write said updated location to a third register associated with said bridge component.

31. The system of claim 24, wherein said routing component is operable to update said memory location by writing an updated location to said first register, wherein said updating is performed subsequent to writing said updated location to a third register associated with said bridge component, and wherein said updated location is determined by snooping a port corresponding to said third register.

32. The system of claim 24, wherein said routing component is operable to update said memory location by writing an updated location to said first register, wherein said updating is performed subsequent to receipt of a plurality of data packets from said bridge component, wherein said plurality of data packets enable said routing component to determine said updated location.

33. The system of claim 24, wherein said processor is an x86 central processing unit.

* * * * *

UNITED STATES PATENT AND TRADEMARK OFFICE
CERTIFICATE OF CORRECTION

PATENT NO.         : 8,661,265 B1
APPLICATION NO.    : 11/479486
DATED              : February 25, 2014
INVENTOR(S)        : Dunn Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1774 days.

Signed and Sealed this
Twenty-second Day of April, 2014

Michelle K. Lee
*Deputy Director of the United States Patent and Trademark Office*